April 26, 1966 B. J. WARMAN 3,248,485

AUTOMATIC TELEPHONE EXCHANGE SYSTEMS

Filed Oct. 12, 1962 15 Sheets-Sheet 2

April 26, 1966 B. J. WARMAN 3,248,485
AUTOMATIC TELEPHONE EXCHANGE SYSTEMS
Filed Oct. 12, 1962 15 Sheets-Sheet 7

April 26, 1966 B. J. WARMAN 3,248,485

AUTOMATIC TELEPHONE EXCHANGE SYSTEMS

Filed Oct. 12, 1962 15 Sheets-Sheet 8

3,248,485
AUTOMATIC TELEPHONE EXCHANGE SYSTEMS
Bloomfield James Warman, Charlton, London, England, assignor to Associated Electrical Industries Limited, London, England, a British company
Filed Oct. 12, 1962, Ser. No. 230,109
1 Claim. (Cl. 179—22)

Figure 1:
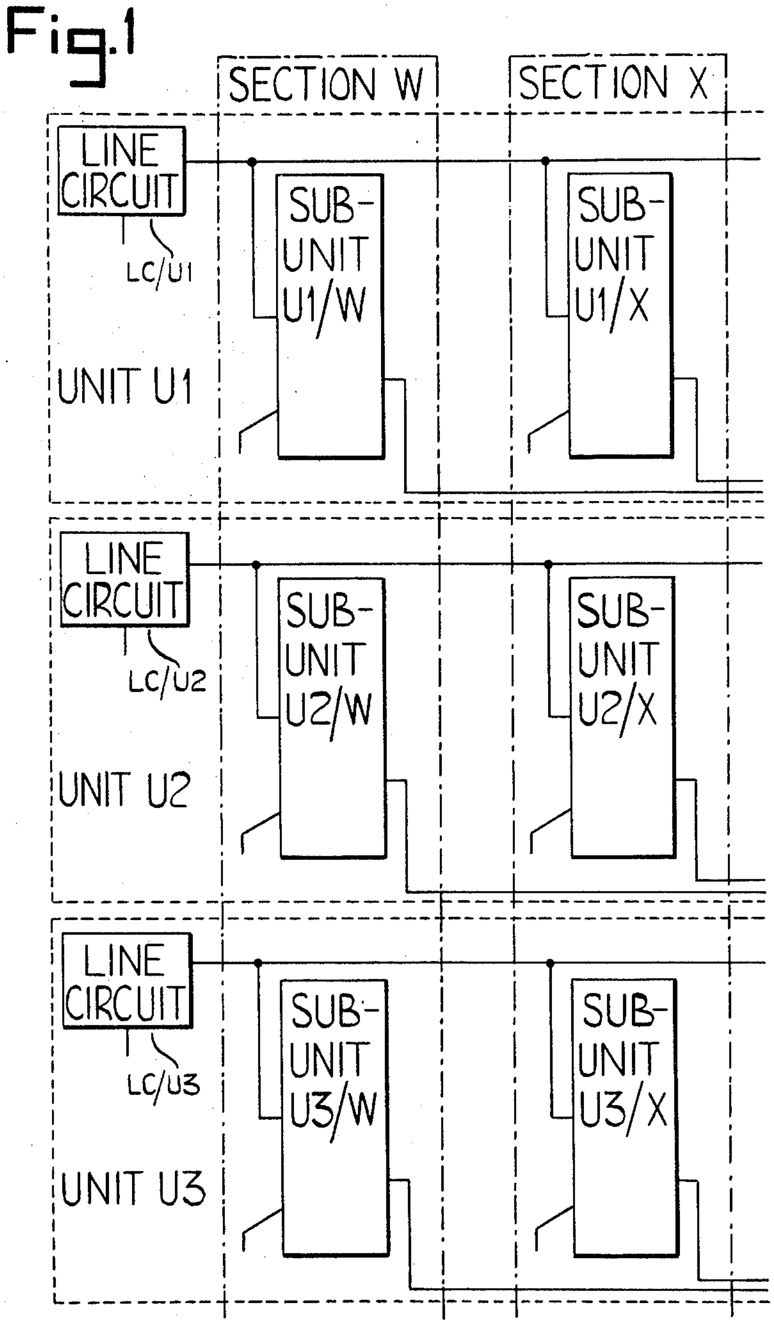
Figure 2:
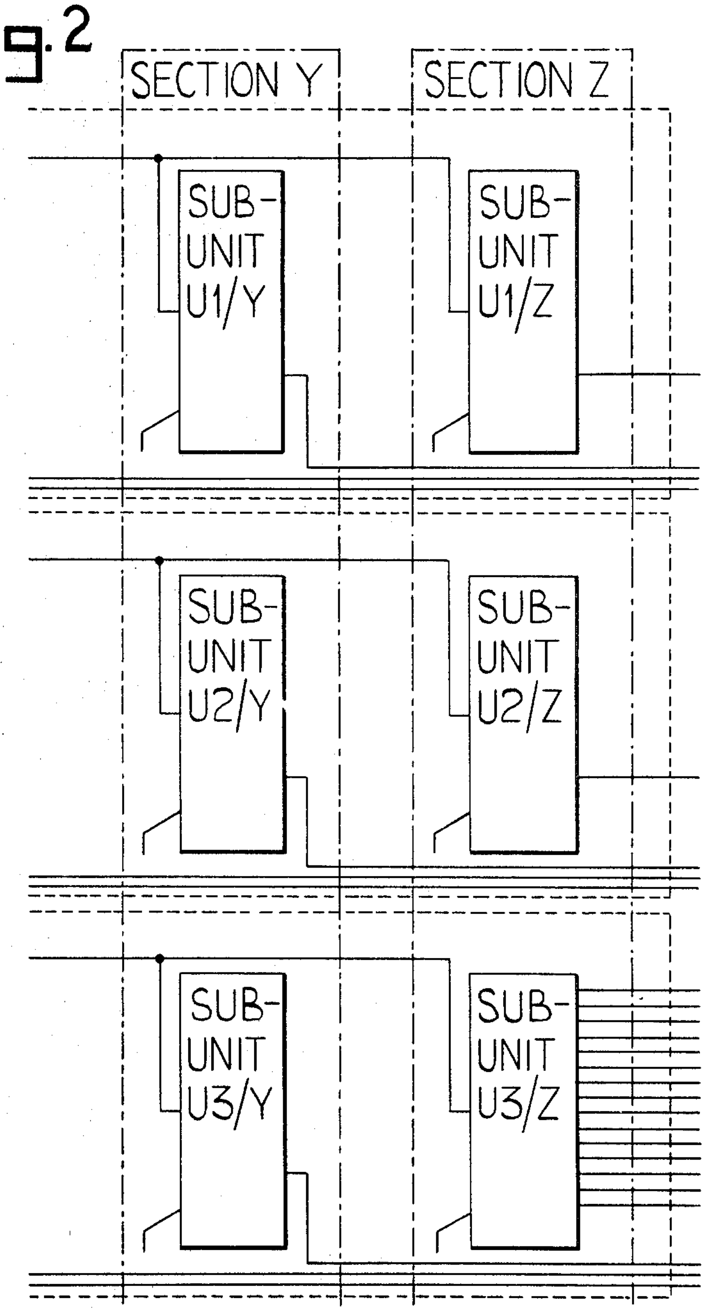
Figure 3:
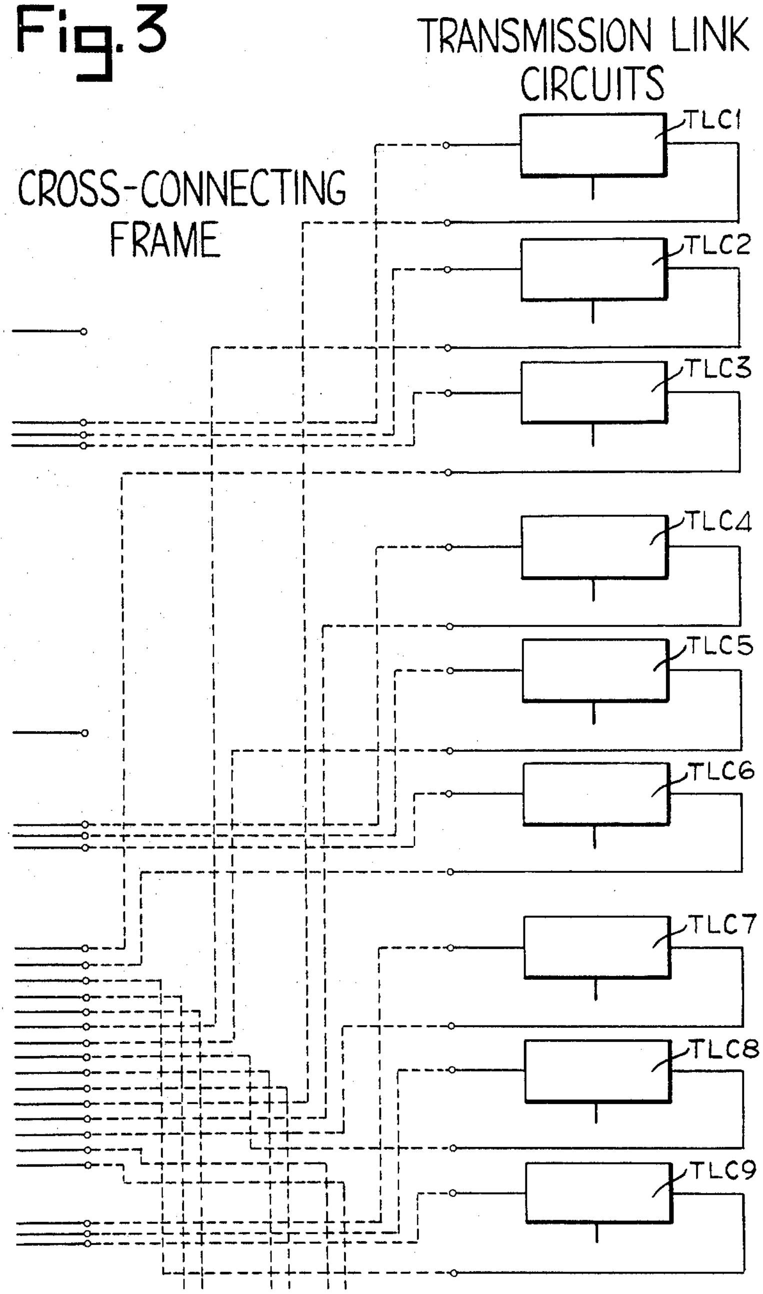
Figure 4:
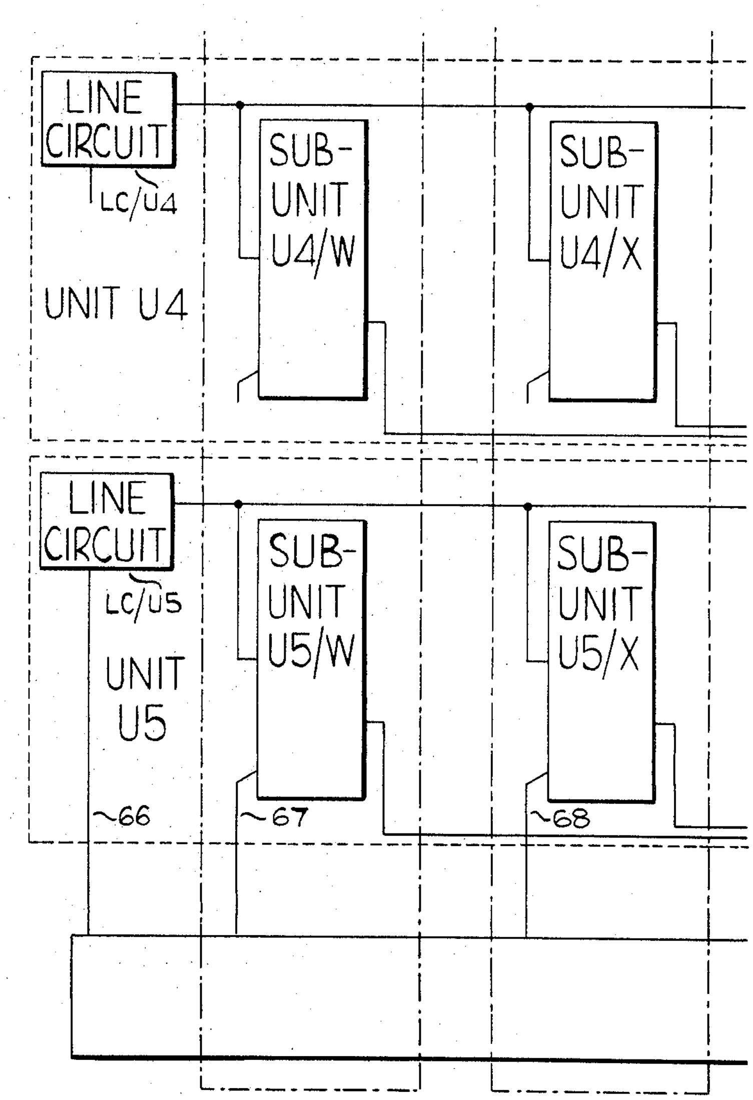
Figure 5:
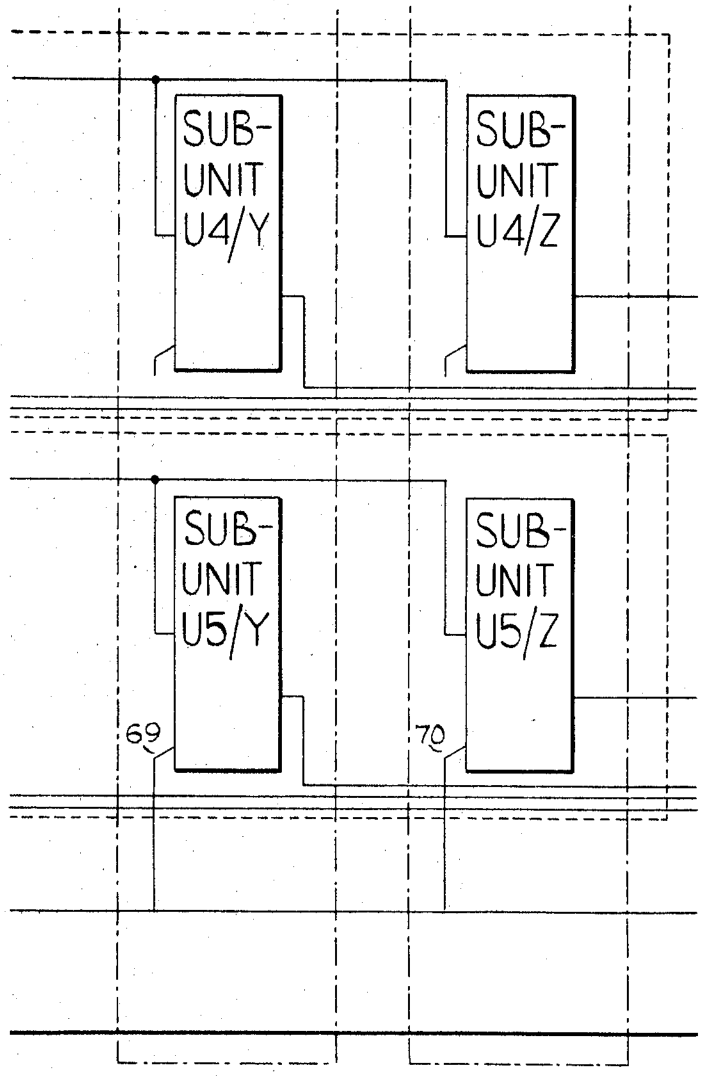
Figure 6:
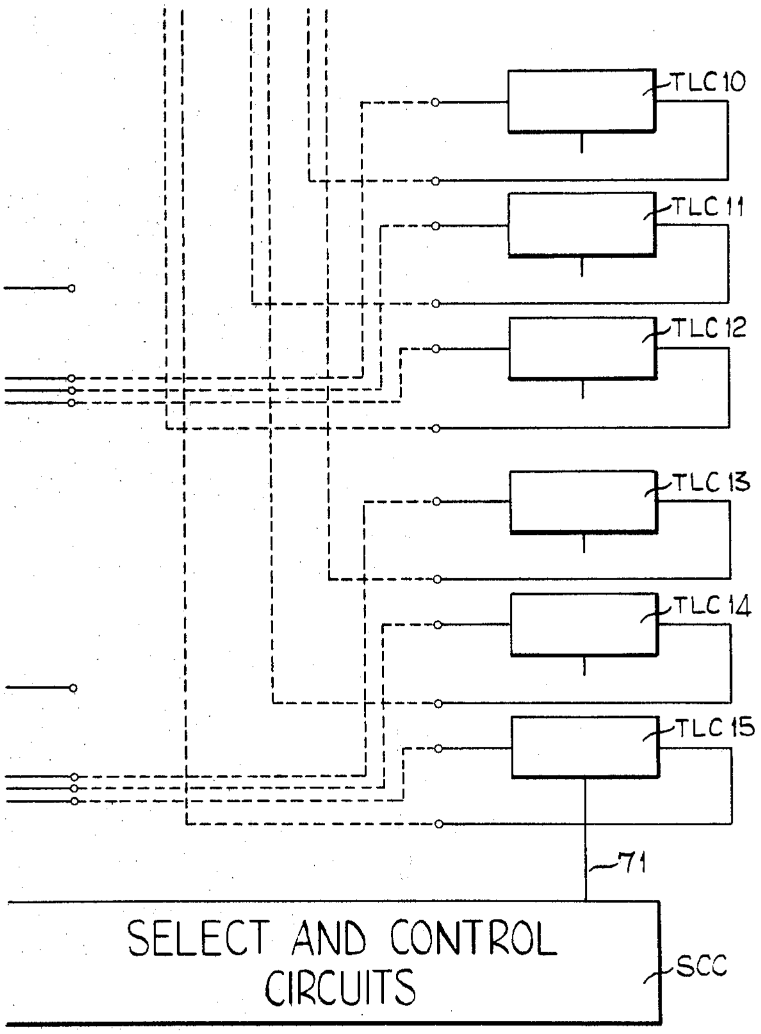

This invention relates to automatic telephone exchange systems, and more particularly to automatic telephone exchange systems using electro-mechanical switches of the cross-bar type.

In the specification accompanying my co-pending patent application Serial No. 122,137, filed July 6, 1961, there is described an invention which is though to represent an entirely new concept in automatic exchange design. Basically, and in general terms, this concept is to provide the switching equipment, which in an automatic exchange permits the selective establishment of communication paths between lines connected to the exchange, in a plurality of sections which together afford between any two of said lines, through the switching equipment, a plurality of possible communication paths of which the incoming portions are respectively afforded by various ones of said sections and the outgoing portions are likewise afforded by various ones of these sections, and to provide also a section selecting arrangement which in respect of a call between two lines, and on the basis of information fed to it as to pertinent conditions relative to the several sections, is operable to cause the establishment of a connection between said two lines over such one of the possible communication paths (afforded by the sections as aforesaid) as will give best advantage having regard to said conditions.

Hereinafter, the terms "section" and "sections" will be used to mean one or some or all (as the case may be) of the sections in which switching equipment at an automatic telephone exchange is provided in accordance with the new concept referred to.

In the case of a contemplated form of automatic telephone exchange system embodying the new concept referred to, the switching equipment at an automatic telephone exchange sectionalised in accordance with this concept is arranged so that in general, as regards any complete communication path, through the switching equipment, between any two lines connected to the exchange, the path involves two of the sections, namely a section affording an incoming portion of the path and a different section affording an outgoing portion of the path, said two portions of the path being linked by way of a transmission link circuit. The switching equipment is in general made up of a plurality of units each serving a proportion of the total number of lines, and each such unit comprises a plurality of sub-units each comprising a plurality of switches, this plurality of sub-units being constituted by one sub-unit for and individual to each of the sections (so that a unit comprises as many such sub-units as there are sections). Each sub-unit is linked to other sub-units by way of transmission link circuits, these other sub-units being sub-units which pertain to sections other than the section to which the particular sub-unit pertains, and being sub-units which, taken as a whole, include at least one sub-unit in each unit. The sub-units are such that a sub-unit is adapted to serve both in respect of calls outgoing from, and in respect of calls incoming to, the lines it serves, and the transmission link circuits are such that either side of a transmission link circuit (at least as regards speaking wire terminals, or equivalent terminals, of the link circuit) can serve when requisite as the incoming side connected towards the calling line of a call, the remaining side in each case serving as the outgoing side connected towards the called line of the call. Hereinafter, the terms "unit" and "sub-unit", and the expression "transmission link circuit", will be used to mean a unit or sub-unit or transmission link circuit (as the case may be) as just referred to.

In one aspect, the present invention is concerned with the provision of an improved switching arrangement which is adapted for use in, or as, a sub-unit in the form of automatic telephone exchange system referred to, and which is a switching arrangement of a kind comprising cross-bar switches arranged in a plurality of serially-connected ranks each comprising a plurality of switches.

In another aspect, the present invention provides an improved and novel arrangement for controlling and effecting, in a switching arrangement as just mentioned, the selective establishment, under the control of a marker, of a communication path through the plurality of ranks of cross-bar switches that the switching arrangement comprises.

The general form and manner of operation of cross-bar switches are well known. In general, such a switch comprises a plurality of holding magnets (e.g. ten holding magnets each individual to a respective one of ten so-called vertical units) and a plurality of selecting magnets (usually ten selecting magnets), the magnets being of course electromagnets. In the case of such a switch, if firstly a selecting magnet of the switch is energised and then a holding magnet of the switch is energised, the selecting magnet remaining energised, the contact set at the relevant "cross-point" is operated and thereafter remains operated, independently of the selecting magnet, for as long as the holding magnet is energised. Usually, each holding magnet of such a switch controls a corresponding holding magnet contact having the form of a simple make contact which is closed during periods in which the magnet it energised.

According to a main feature of the invention, in a switching arrangement of a kind comprising cross-bar switches arranged in a plurality of serially-connected ranks each comprising a plurality of switches, the selective establishment of a communication path through the plurality of ranks of switches is controlled and effected by firstly causing, in respect of each of the ranks, a circuit to be closed for energising together (e.g. in parallel) a plurality of selecting magnets constituted by one selecting magnet in each of the switches of the arrangement that belong to the particular rank, these selecting magnets including the particular one that has to be operated, so far as the particular rank is concerned, for effecting the selective establishment of said communication path, and then applying a holding condition to a holding wire pertaining to the particular one of the terminal trunks of the switches of the last of the ranks that is the terminal trunk included in said communication path and associated with the particular holding magnet that has to be operated, so far as the last rank is concerned, for effecting the selective establishment of this path, the switching arrangement as a whole being such that this application of a holding condition results in the energisation of said particular holding magnet and the consequent operation of the contact set at the relevant cross-point of the relevant switch of the last of the ranks, and that this operation causes a holding condition to be applied in turn to a holding wire pertaining to the particular one of the terminal trunks of the switches of the last but one of the ranks that is the terminal trunk included in said communication path and associated with the particular holding magnet that has to be operated, so far as the last but one of the ranks is concerned for effecting the selective establishment of this path, and that this further application of a holding condition results in the energisation of the last-mentioned holding magnet, and so on.

The nature of the invention will be more clearly understood from the description which will now be given with reference to the accompanying drawings.

Figure 7:
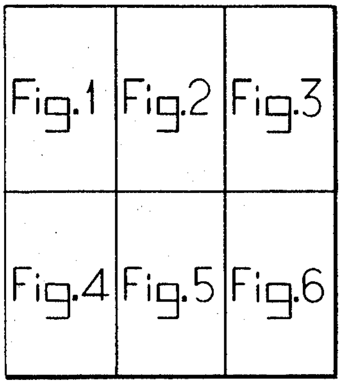
Figure 15:
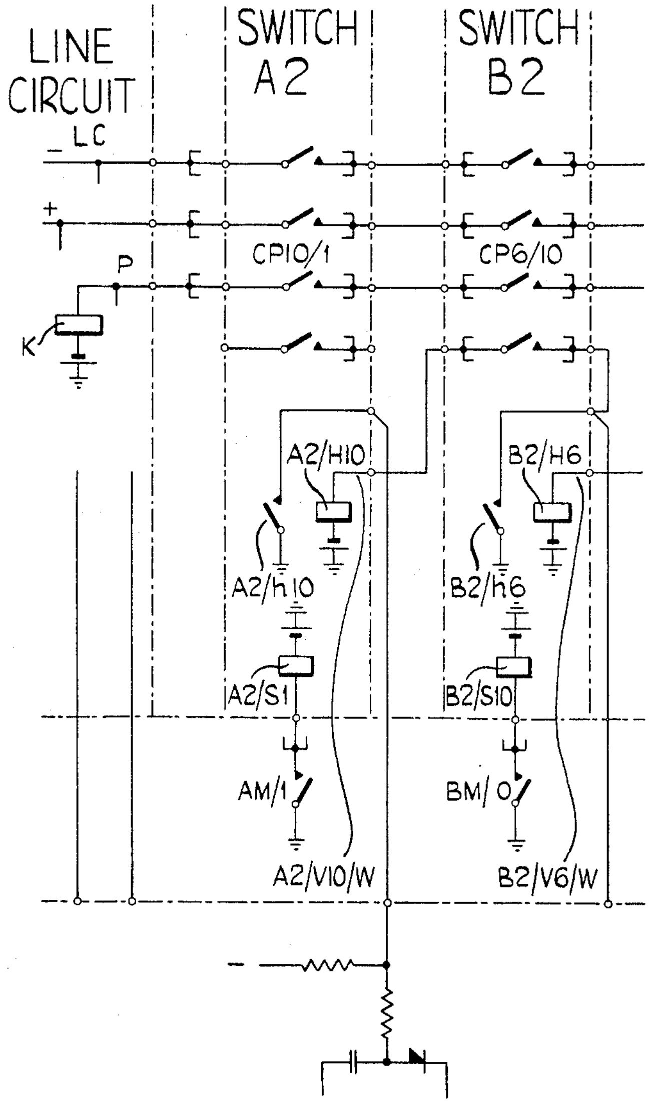
Figure 16:
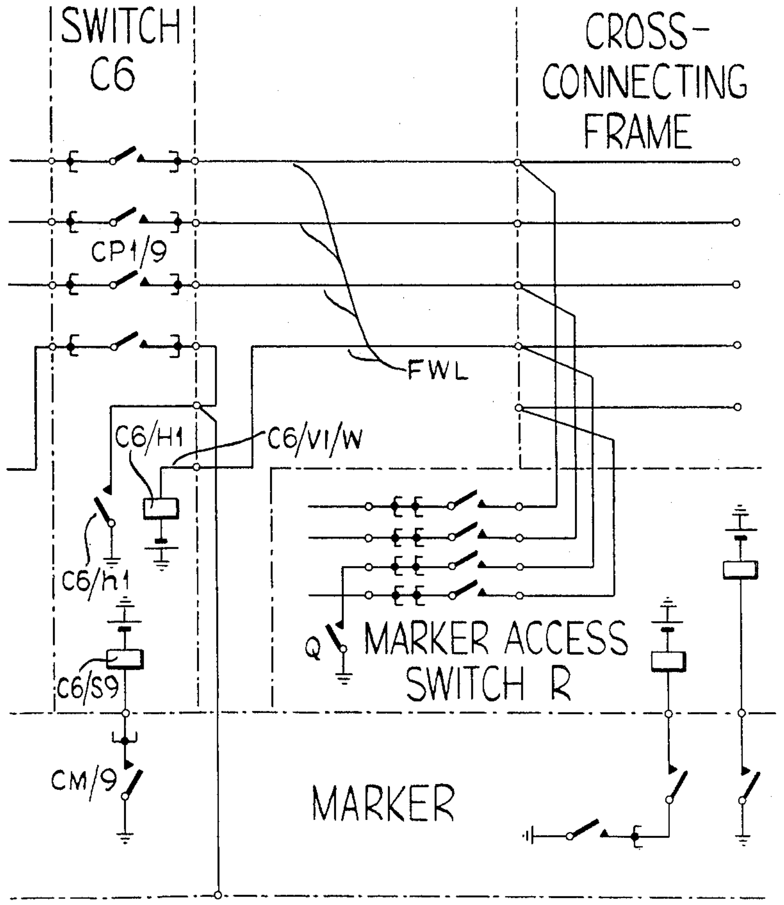

FIGS. 1 to 6 of these drawings together constitute, when assembled in the manner shown in FIG. 7, a schematic diagram showing in broad fashion the relationship of the "sections," "units," and "sub-units" of the switching equipment at an automatic telephone exchange sectionalised in accordance with the new concept referred to. FIGS. 8 to 13 together constitute, when assembled in the manner shown in FIG. 14, a schematic trunking diagram of a switching arrangement embodying the present invention and adapted for use to form a sub-unit of the switching equipment just referred to. FIGS. 15 and 16 together constitute, when assembled as shown in FIG. 17, a circuit diagram illustrating a typical communication path through the three ranks of serially-connected cross-bar switches comprised in the switching arrangement illustrated in FIGS. 8 to 13.

Referring firstly to FIGS. 1 to 6 (which as just indicated should be viewed assembled in the manner shown in FIG. 7), the schematic diagram constituted by these figures shows in broad fashion the relationship of the four sections W, X, Y and Z, the five units U1 to U5, and the twenty-five sub-units U1/W, U2/W . . . U5/W, P1/X . . . U5/X, U1/Y . . . U5/Y, U1/Z . . . and U5/Z of the switching equipment at an automatic telephone exchange sectionalised in accordance with the new concept referred to. This switching equipment is arranged to serve 5000 lines. Each of the units U1 to U5 serves a proportion of the total number of lines, namely 1000 lines. Five typical line circuits LC/U1 to LC/U5, pertaining to the five units U1 to U5 respectively, are represented in the diagram. Each of the units comprises four sub-units, one for and individual to each of the sections. Thus, for example, unit U1 comprises the sub-unit U1/W pertaining to section W, the sub-unit U1/X pertaining to section X, the sub-unit U1/Y pertaining to section Y, and the sub-unit U1/Z pertaining to section Z. Each sub-unit is linked to other sub-units by way of transmission link circuits, and a cross-connecting frame is provided to facilitate the making of the connections involved in such linking of the sub-units. For the sake of simplicity, only certain typical ones TLC1 to TLC15 of the transmission link circuits, and corresponding typical ones of the cross-connections on the cross-connecting frame, are represented in the diagram. As will be clear from a detailed examination of the diagram, the fifteen typical transmission link circuits TLC1 to TLC15 represented in the diagram are all link circuits involved (when cross-connections as represented exist on the cross-connecting frame) in the linking of the sub-unit U3/Z to other sub-units. As is exemplified by the typical cross-connections represented for the sub-unit U3/Z, the other sub-units to which each sub-unit is linked by way of transmission link circuits are sub-units which pertain to sections other than the section to which the particular sub-unit pertains, and which, taken as a whole, include at least one sub-unit in each unit. The switching equipment is arranged so that, as regards any complete communication path, through the switching equipment, between any two of the 5000 lines, the path involves two of the sections, namely a section affording an incoming portion of the path and a different section affording an outgoing portion of the path, the two portions being linked by way of a transmission link circuit. Thus, for example, a complete communication path between the line to which line circuit LC/U1 pertains and the line to which line circuit LC/U3 pertains may be provided by sub-unit U1/X, transmission link circuit TLC2, and sub-unit U3/Z (and hence involves sections X and Z). The sub-units are such that a sub-unit is adapted to serve both in respect of calls outgoing from, and in respect of calls incoming to, the lines it serves, and transmission link circuits are such that either side of the transmission link circuit can serve as the incoming side connected towards the calling line of a call, the remaining side in each case serving as the outgoing side connected towards the called line of the call. Thus a complete communication path between the line to which line circuit LC/U1 pertains and the line to which line circuit LC/U3 pertains, and provided by sub-unit U1/X, transmission link circuit TLC2, and sub-unit U3/Z, may be set up to serve for a call outgoing from the first-mentioned line to the second-mentioned line or be set up to serve for a call outgoing from the second-mentioned line to the first-mentioned line. The selective establishment of connections through the switching equipment is controlled and effected by select and control circuits, including the requisite section selecting arrangement, which are represented schematically in the diagram by a rectangle SCC. These select and control circuits have connections to the line circuits (as is represented typically at 66 in the diagram), and to the sub-units (as is represented typically at 67, 68, 69 and 70 in the diagram), and to the transmission link circuits (as is represented typically at 71 in the diagram).

Figure 14:
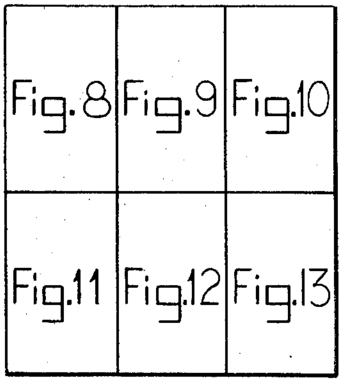

Referring now to FIGS. 8 to 13 (which as already indicated should be viewed assembled in the manner shown in FIG. 14), the diagram constituted by these figures is a schematic trunking diagram of a switching arrangement comprising twenty-six cross-bar switches and embodying the present invention and adapted for use to form a sub-unit of the switching equipment of FIGS. 1 to 6. The twenty-six cross-bar switches are arranged in three serially-connected ranks, namely a first rank (rank A) comprising ten switches A1 to A10, a second or last-but-one rank (rank B) comprising ten switches B1 to B10, and a third or last rank (rank C) comprising six switches C1 to C6. Each of the switches A1 to A10 has ten selecting magnets (magnets such as A1/S1 and A2/S1 and A10/S1 and ten holding magnets (magnets such as A1/H1 and A2/H1 and A10/H1) and 100 cross-points, and does not have the contact sets at its cross-points multipled horizontally, the absence of horizontal multipling enabling it to serve one hundred (10 x 10) line circuits. Each of the switches B1 to B10 has ten selecting magnets (magnets such as B1/S1 and B2/S1 and B10/S1) and six holding magnets (magnets such as B1/H1 and B2/H1 and B10/H1) and 60 cross-points, and has the contact sets at its cross-points multipled horizontally. Each of the switches C1 to C6 has ten selecting magnets (magnets such as C1/S1 and C6/S1) and five holding magnets (magnets such as C1/H1 and C6/H1) and 50 cross-points, and has the contact sets at its cross-points multipled horizontally. As regards each switch of rank A, each of the ten terminal trunks of the switch that correspond to the ten "verticals" of the switch is connected to a corresponding one of the ten terminal trunks of the corresponding switch of rank B that correspond to the ten "horizontals" of that switch of rank B. As regards each switch of rank B, the six terminal trunks of the switch that correspond to the six "verticals" of the switch are connected (in accordance with an orderly scheme) so that one is connected to one of the ten terminal trunks of switch C1 that correspond to the ten "horizontals" of switch C1, one is connected to one of the ten terminal trunks of switch C2 that correspond to the ten "horizontals" of switch C2, one is connected to one of the ten terminal trunks of switch C3 that correspond to the ten "horizontals" of switch C3, and so on. Ten marker contacts AM/1 . . . AM/9, AM/0 are provided for controlling the selecting magnets of the switches of rank A, ten marker contacts BM/1 . . . BM/9, BM/0 are provided for controlling the selecting magnets of the switches of rank B, and ten marker contacts CM/1 . . . CM/9, CM/0 are provided for controlling the selecting magnets of the switches of rank C. As is clearly represented in the diagram, each marker contact controls a plurality of selecting magnets, the plurality being constituted by one selecting magnet in each of the switches that belong to the rank concerned, and these selecting magnets being corresponding ones in the switches concerned. The selective establishment of a communication path through the three ranks of switches is controlled and effected by firstly causing, in respect of each of the ranks, the relevant one of the ten marker contacts that pertain to the particular rank to be closed to complete a circuit for energising in parallel the plurality of selecting magnets controlled by the contact, and then applying a holding condition to a holding wire pertaining to the relevant one of the thirty (6 x 5) terminal trunks of switches C1 to C6 that correspond to the "verticals" of these six switches. The switching arrangement as a whole is such (as will appear more fully later when a description is given with reference to FIGS. 15 and 16) that this application of a holding condition results in the energisation of the holding magnet pertaining to the relevant terminal trunk just referred to and the consequent operation of the contact set at the relevant cross-point of the relevant one of the switches C1 to C6, and that this operation causes a holding condition to be applied in turn to a holding wire pertaining to the relevant one of the sixty (10 x 6) terminal trunks of switches B1 to B10 that correspond to the "verticals" of these ten switches, and that this further application of a holding condition results in the energisation of the holding magnet pertaining to the relevant terminal trunk last referred to, and so on. Thus if, for example, the communication path to be established is the one extending from the terminal trunk A2/10/1 of switch A2 (on the one hand) to the terminal trunk C6/V1 of switch C6 (on the other hand) by way of the terminal trunk A2/V10 of switch A2 and the terminal trunk B2/V6 of switch B2, then the selective establishment of the path is controlled and effected by firstly causing the marker contacts AM/1, BM/0, and CM/9 to be closed, and then applying a holding condition to a holding wire pertaining to the terminal trunk C6/V1. This application of a holding condition results in the energisation of the holding magnet C6/H1 of switch C6 and the consequent operation, since the selecting magnet C6/S9 of switch C6 is energised over marker contact CM/9, of the contact set at cross-point 1/9 of switch C6. This operation causes the terminal trunk C6/V1 to be connected through to the terminal trunk B2/V6 of switch B2 and this causes a holding condition to be applied in turn to a holding wire pertaining to the terminal trunk B2/V6. This further application of a holding condition results in the energisation of the holding magnet B2/H6 of switch B2 and the consequent operation, since the selecting magnet B2/S10 of switch B2 is energised over marker contact BM/0, of the contact set at cross-point 6/10 of switch B2. This operation causes the terminal trunk C6/V1 to be connected through to the terminal trunk A2/V10 of switch A2, and a holding condition to be applied in turn to a holding wire pertaining to the terminal trunk A2/V10. This particular application of a holding condition results in the energisation of the holding magnet A2/H10 of switch A2 and the consequent operation, since the selecting magnet A2/S1 of switch A2 is energised over marker contact AM/1, of the contact set at cross-point 10/1 of switch A2. This operation causes the terminal trunk C6/V1 to be connected through to the terminal trunk A2/10/1 of switch A2, completing the establishment of the communication path that it is required to establish. Upon the operation of the contact set at cross-point 10/1 of switch A2, the marker contacts AM/1, BM/0 and CM/9 are opened in preparation for further use of the marker, leaving the continued maintenance of the established communication path dependent upon a holding condition applied to a holding wire by the relevant transmission link circuit.

Figure 17:
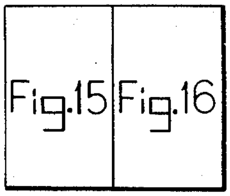
Figure 8:
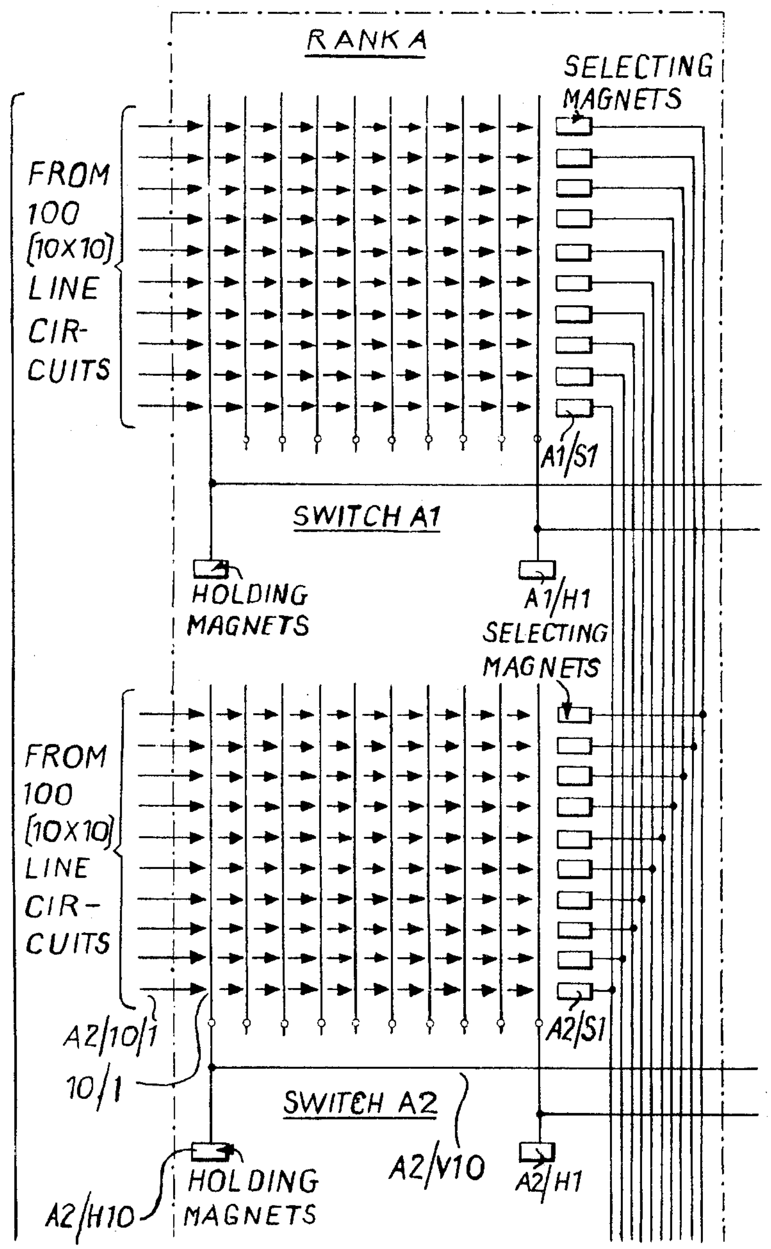
Figure 9:
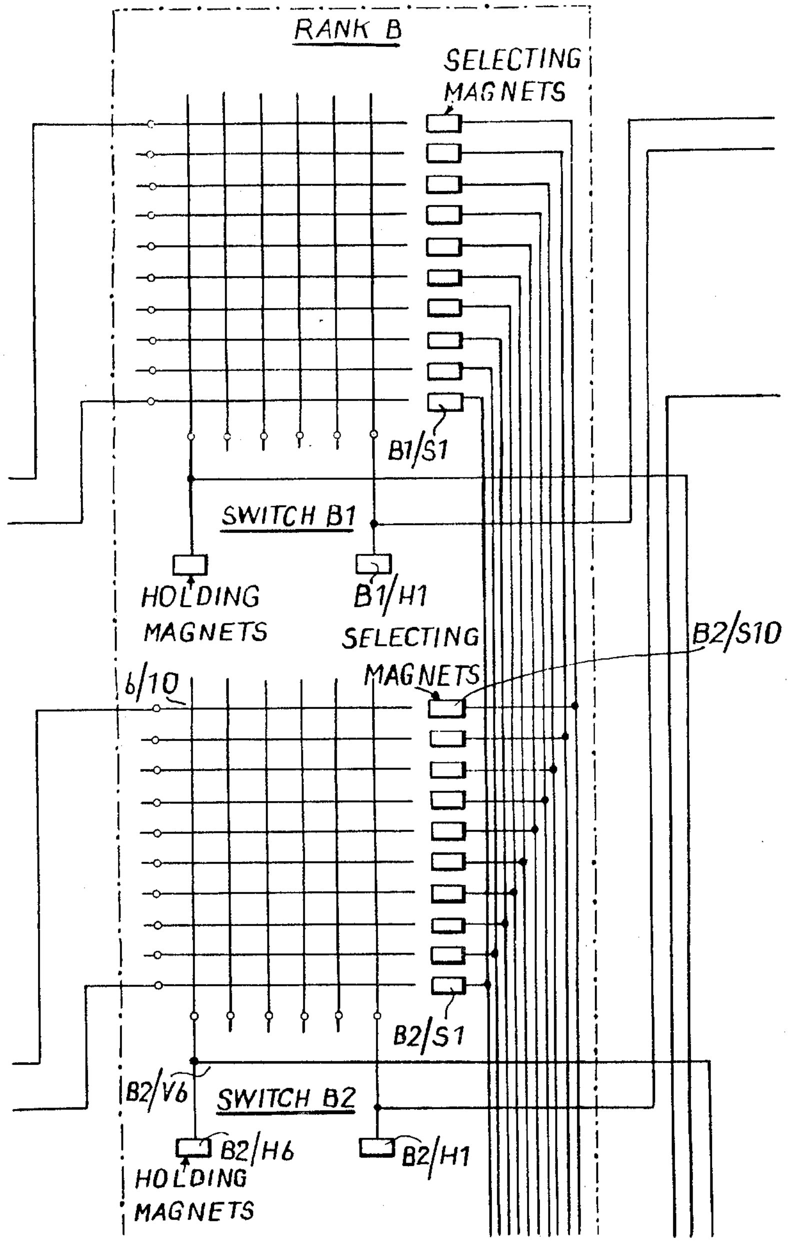
Figure 10:
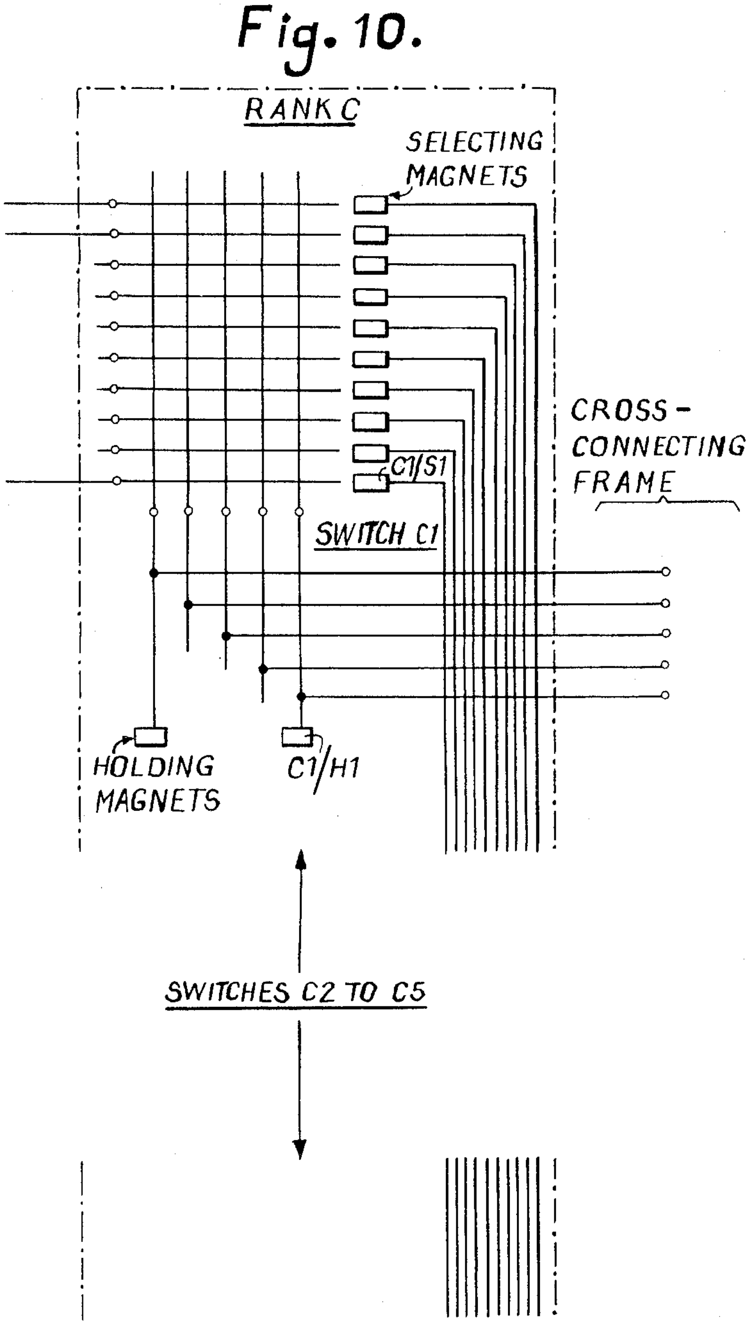
Figure 11:
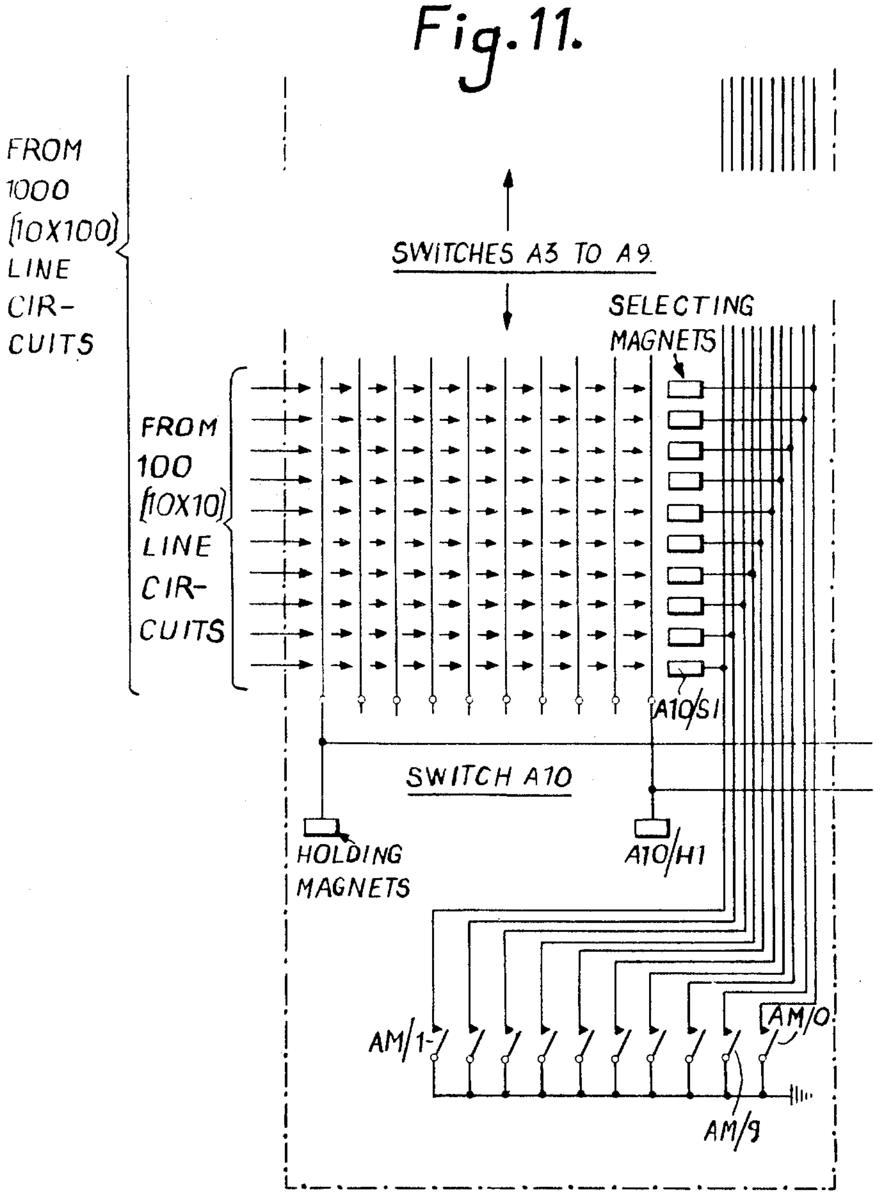
Figure 12:
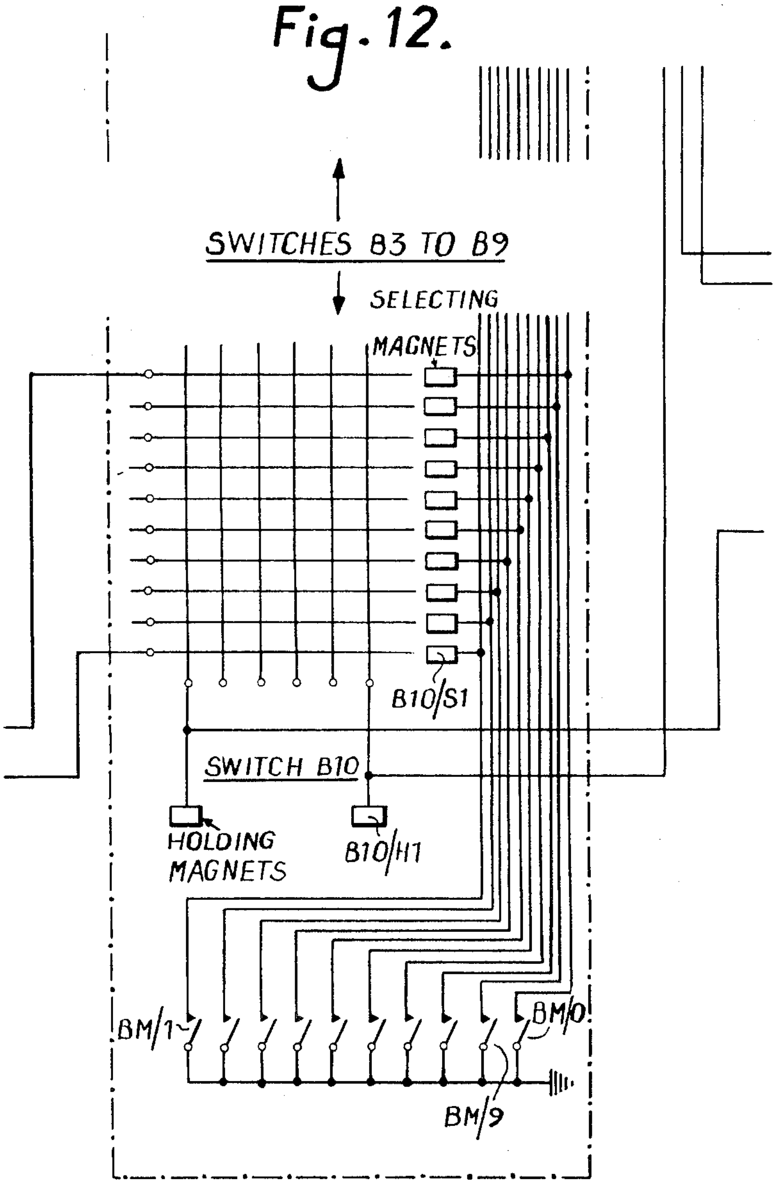
Figure 13:
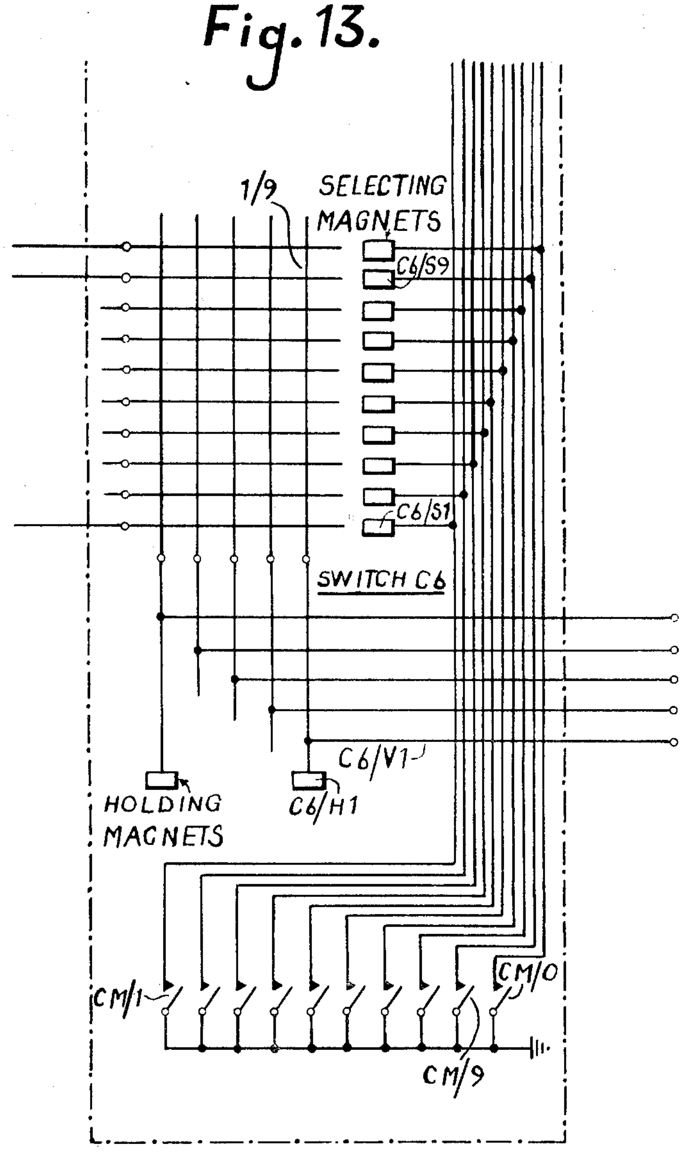

Referring now to FIGS. 15 and 16 (which as already indicated should be viewed assembled as shown in FIG. 17), the circuit diagram constituted by these figures serves to show the circuitry involved in the selective establishment of the particular communication path (involving switches A2, B2, and C6 of the switching arrangement of FIGS. 8 to 13) which has just been referred to. The line circuit LC of which a part (including the cut-off relay K) as shown is intended to be considered as being the line circuit connected to the terminal trunk A2/10/1 of switch A2. The four-wire link FWL shown extending between switch C6 and the cross-connecting frame is intended to be considered as being connected to the terminal trunk C6/V1 of switch C6. The circuit diagram shows at CP10/1 the four make contacts of the contact set at cross-point 10/1 of switch A2, and shows at CP6/10 the four make contacts of the contact set at cross-point 6/10 of switch B2, and shows at CP1/9 the four make contacts of the contact set at cross-point 1/9 of switch C6. The contacts A2/*h*10, B2/*h*6, and C6/*h*1 are the holding magnet contacts of holding magnets A2/H10, B2/H6 and C6/H1 respectively. The wires C6/V1/W, B2/V6/W, and A2/V10/W are the holding wires pertaining to terminal trunks C6/V1, B2/V6, and A2/V10 respectively. On each of these wires the holding condition is earth. For the establishment of the particular communication path, the earth holding condition is applied to wire C6/V1/W by way of a contact Q and a relevant contact of the contact set at the relevant cross-point of a marker access switch R. This application of the earth holding condition is of course preceded by the closing of the marker contacts AM/1, BM/0, and CM/9, and results in the energisation of the holding magnet C6/H1 of switch C6 and the consequent operation (since the selecting magnet C6/S9 of this switch is energised over marker contact CM/9) of the contact set CP1/9. This operation causes the earth holding condition to be applied in turn, over a circuit including holding magnet contact C6/*h*1, to the holding wire B2/V6/W. This further application of the earth holding condition results in the energisation of the holding magnet B2/H6 of switch B2 and the consequent operation (since the selecting magnet B2/S10 of this switch is energised over marker contact BM/0) of the contact set CP6/10. This operation causes the earth holding condition to be applied in turn, over a circuit including holding magnet contact B2/*h*6, to the holding wire A2/V10/W. This particular application of the earth holding condition results in the energisation of the holding magnet A2/H10 of switch A2 and the consequent operation (since the selecting magnet A2/S1 of this switch is energised over marker contact AM/1) of the contact set CP10/1.

What I claim is:

An automatic telephone exchange system switching arrangement comprising in combination: a plurality of crossbar switches arranged in a plurality of serially connected ranks, each rank being comprised of a plurality of crossbar switches, each crossbar switch including a plurality of vertical conductors and associated holding magnets, and a plurality of horizontal conductors and associated selecting magnets, each vertical conductor having connected thereto a terminal trunk of a first kind, including a holding wire connected to the associated holding magnet, each horizontal conductor having connected thereto at least one terminal trunk of a second kind, means interconnecting in pairs, terminal trunks of said first kind associated with switches in each of said ranks with terminal trunks of said second kind associated with switches of a succeeding rank, means to establish a communication path including a first of said ranks, and one or more succeeding ranks in series, said last-named means comprised of means to selectively energize in each of said ranks, a selecting magnet in each of the switches of that particular rank, means for applying, following the energization of the selecting magnets, a holding signal to the holding wire of a particular one of the terminal trunks of said first kind of the switches of the last of the ranks that is to be included in said communication path, whereby a cross-point contact set is operated in the last of said ranks, means responsive to the operation of a contact set to apply a holding signal through a contact of said contact set to the holding wire of a particular one of the terminal trunks of said first kind of the switches of the preceding rank that is to be included in the communication path, contact sets in switches of each of said ranks being successively energized until a communication path is established between a series of ranks.

References Cited by the Examiner

FOREIGN PATENTS 757,025 9/1956 Great Britain.

ROBERT H. ROSE, *Primary Examiner.*

WILLIAM C. COOPER, *Assistant Examiner.*